US006411256B1

(12) United States Patent
Lier et al.

(10) Patent No.: US 6,411,256 B1
(45) Date of Patent: Jun. 25, 2002

(54) REDUCTION OF LOCAL OSCILLATOR SPURIOUS RADIATION FROM PHASED ARRAY TRANSMIT ANTENNAS

(75) Inventors: Erik Lier, Newtown; Anthony Jacomb-Hood, Yardley, both of PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/855,719

(22) Filed: May 16, 2001

(51) Int. Cl.[7] ............................ H01Q 3/22; H04Q 7/20

(52) U.S. Cl. .................. 342/375; 455/429; 343/DIG. 2

(58) Field of Search ................................ 342/368, 375; 455/426–430, 448; 343/DIG. 2

(56) References Cited

U.S. PATENT DOCUMENTS 5,394,561 A * 2/1995 Freeburg .................. 455/13.1
5,870,063 A 2/1999 Cherrett et al.
2001/0034206 A1 * 10/2001 Thompson et al. ........ 455/12.1

* cited by examiner

*Primary Examiner*—Thomas H. Tarcza
*Assistant Examiner*—Fred H Mull
(74) *Attorney, Agent, or Firm*—Swidler Berlin Shereff Friedman, LLP

(57) ABSTRACT

The present invention is a system and method for reducing the transmission of spurious radiation produced by local oscillators (LOs) in a spacecraft-based phased array antenna. The spurious radiation is reduced by spreading a substantial portion of the radiation outside of the earth disk. The spurious LO leakage radiation is spread by adjusting the phase of the LO signal to a specific value in each elemental path such as shifting the phase of the LO signal in every other elemental path by 180 degrees. The phase shifting of the LO signal can be accomplished by various methods, such as the insertion of a transmission line having a length of λ/2 in the LO signal path prior to entering a mixer in every other elemental path, where λ is the wavelength of the LO signal.

20 Claims, 10 Drawing Sheets

900

REDUCTION OF LOCAL OSCILLATOR SPURIOUS RADIATION FROM PHASED ARRAY TRANSMIT ANTENNAS

FIELD OF THE INVENTION

The present invention relates generally to a system and method for reducing the transmission of spurious radiation from an antenna. More specifically, the present invention relates to a system and method for spreading out the transmission of spurious radiation produced by local oscillators in a spacecraft-based phased array antenna.

BACKGROUND OF THE INVENTION

A typical problem of spacecraft-based transmitting antennas is the radiation of spurious out-of-band transmissions. Satellite antenna spurious emission specifications require that the power level of the spurious out-of-band transmissions received on the Earth be less than a maximum power level of typically around −60 dBc relative to the received communication signal over a 4 kHz band. Often, spurious out-of-band emissions produced by transmitting antennas will be spread out over the entire frequency band and therefore it is not difficult to meet this specification requirement. However, local oscillators (LOs) used aboard spacecraft based phased array antennas produce an LO signal having a single frequency tone. A portion of this LO signal typically leaks into the communication signal radiated from the antenna. Because the LO signals are at a single frequency tone, the energy from these LO signals are concentrated within much less than a 4 kHz band. This makes it difficult to meet the spurious emission specification requirement because all the energy from the spurious signal is concentrated within a 4 kHz band. What is needed is an effective method of reducing the level of spurious transmissions transmitted to the destination coverage area that is not too costly or overly complex to implement.

SUMMARY OF THE INVENTION

The present invention is a system and method for reducing the transmission of spurious radiation produced by local oscillators in a spacecraft-based phased array antenna. This spurious radiation is produced by leakage from local oscillator signals in the antenna system. A portion of the local oscillator (LO) signal leaks into the output signal produced by an upconverter. That LO signal leakage is then transmitted from the antenna radiating element as a spurious signal at LO frequency. Since all the LO signals in each elemental path of a conventional IF beamformed phased array have approximately the same phase, the LO signals are all at nearly the same phase when radiated. This causes a strong LO leakage signal transmitted in the boresight direction of the antenna.

The system of the present invention reduces the amount of spurious radiation received at the coverage area of the antenna on the Earth by spreading a substantial portion of the transmitted LO leakage signal outside of the earth disk. Alternatively, a substantial portion of the transmitted LO leakage signal can be spread outside of the desired coverage area. From the perspective of a geostationary satellite, the earth disk is 17.6 degrees in diameter. The antenna thus spreads most of the radiated LO signal power beyond this 17.6 degree disk.

One method of spreading the LO radiated signal outside of the coverage area is to adjust the phase of the LO signal to a specific value in each elemental path. One configuration is to shift the phase of the LO signal in every other elemental path by 180 degrees (or 180±360 n degrees, where n is any integer). This will cause the LO radiation pattern to have a null in the direction of the earth center (assuming that the antenna is transmitting towards the earth), with 4 main lobes separated by 90 degrees in phi-angle around the earth circle and with their peak at approximately 2 times the maximum edge-of-coverage theta-angle (this radiation pattern is specific to a phased array antenna in a geostationary orbit having 2λ spacing between radiating elements, where λ is the wavelength of the LO signal).

One method of accomplishing the phase shift of the LO signal is to insert a transmission line having a length of λ/2 in the LO signal path prior to entering the mixer in every other elemental path, where λ is the wavelength. of the LO signal. This will introduce a phase shift of 180 degrees into the LO signal in every other elemental path. A phase shifter or transmission line in the IF elemental path introduces an offsetting phase shift of −180 degrees, so that the phase of the RF communication signal transmitted by the antenna is not affected by the introduction of the transmission line into the LO signal path.

One embodiment of the transmitting antenna of the present invention includes L beamformers each having N elemental paths, where L and N are positive integers. The antenna also includes N upconverters, one for each elemental path. Each upconverter has a first input coupled to an output of a corresponding elemental path. Each upconverter has a second input receiving a local oscillator signal. N radiating elements are each coupled to an output of a upconverter in the corresponding elemental path. A phase adjustment device, such as a length of transmission line, is coupled to at least one of the upconverters at the second input, wherein each phase adjustment device adjusts the phase of the oscillator signal provided to the corresponding upconverter so as to substantially spread a leakage transmission of the oscillator signal outside the coverage area. In one configuration, the N elements are located in a two dimensional grid. The phase adjustment devices are located in every other elemental path and introduce a phase shift of +180 degrees in the local oscillator signal in that elemental path.

DETAILED DESCRIPTION OF THE INVENTION

Figure 1:
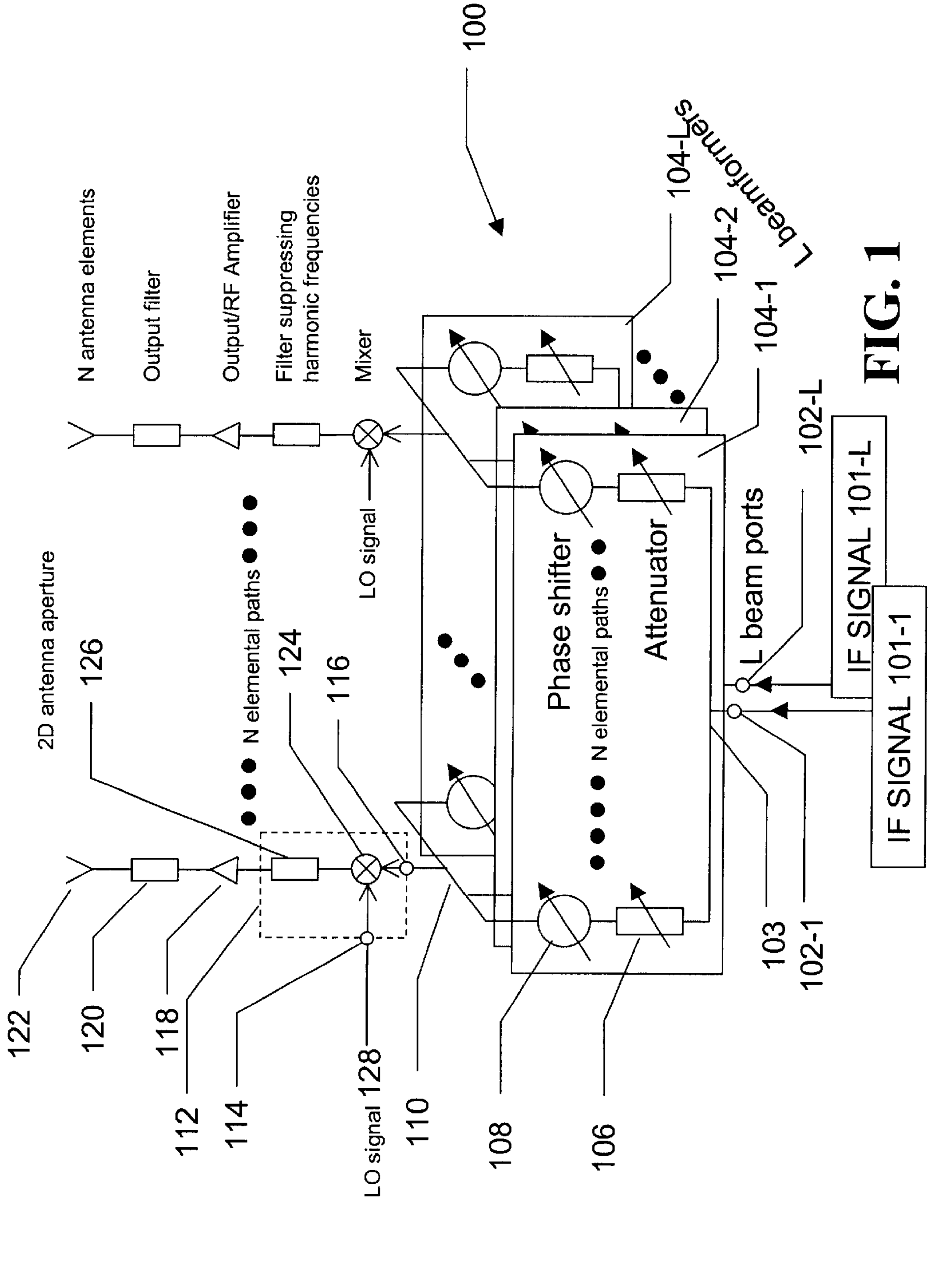
FIG. 1 depicts a block diagram illustrating a transmitting phased array antenna with intermediate frequency beamforming.

FIG. 1 depicts a block diagram illustrating a transmitting phased array antenna 100 with intermediate frequency (IF) beam forming. Antenna 100 includes L beam formers 104, where L is a positive integer representing the number of beams transmitted by the antenna. A single beam antenna has only one beam former 104 (L=1). Although FIG. 1 depicts an example of a multibeam phased array antenna 100, the invention can be applied to an antenna with only a single beam. L intermediate frequency (IF) communication signals 101 containing voice or data are input to L corresponding beamformers 104 at input beam ports 102. For example, IF signal 101-1 is input to beamformer 104-1 at input beam port 102-1. IF signal 101-2 is input to beamformer 104-2 at input beam port 102-2. IF signal 101-L is input to beamformer 104-L at input beam port 102-L. Each beam former 104 processes the IF input signal and forms a beam. Therefore, L beamformers 104 form L separate beams.

Upon entering beamformers 104, each IF signal is split into N elemental paths at 103, where N is a positive integer. Each elemental path inside of the beamformer includes an attenuator 106 and a phase shifter 108. Each attenuator 106 and phase shifter 108 generates a desired amplitude and phase for the signal when radiated from a corresponding antenna radiating element 122 which dictates the beam shape and beam direction to the ground. Each elemental path in the beamformer could potentially just include a phase shifter 108 and no attenuator 106; attenuators 106 are optional.

At the output of phase shifter 108, the IF signal is combined at 110 with the IF signals from the corresponding elemental path from all of the other beamformers 104. Therefore, a total of L IF signals are combined at 110. Next, the IF signal is applied to an upconverter 112. The function of upconverter 112 is to convert the received IF signal up to a desired radio frequency (RF). Upconverter 112 includes a mixer 124 and an RF filter 126. Mixer 124 receives two input signals. A signal 128 from a local oscillator (LO) having an LO frequency is applied to input port 114. The IF signal is applied to -input port 116.

Figure 3:
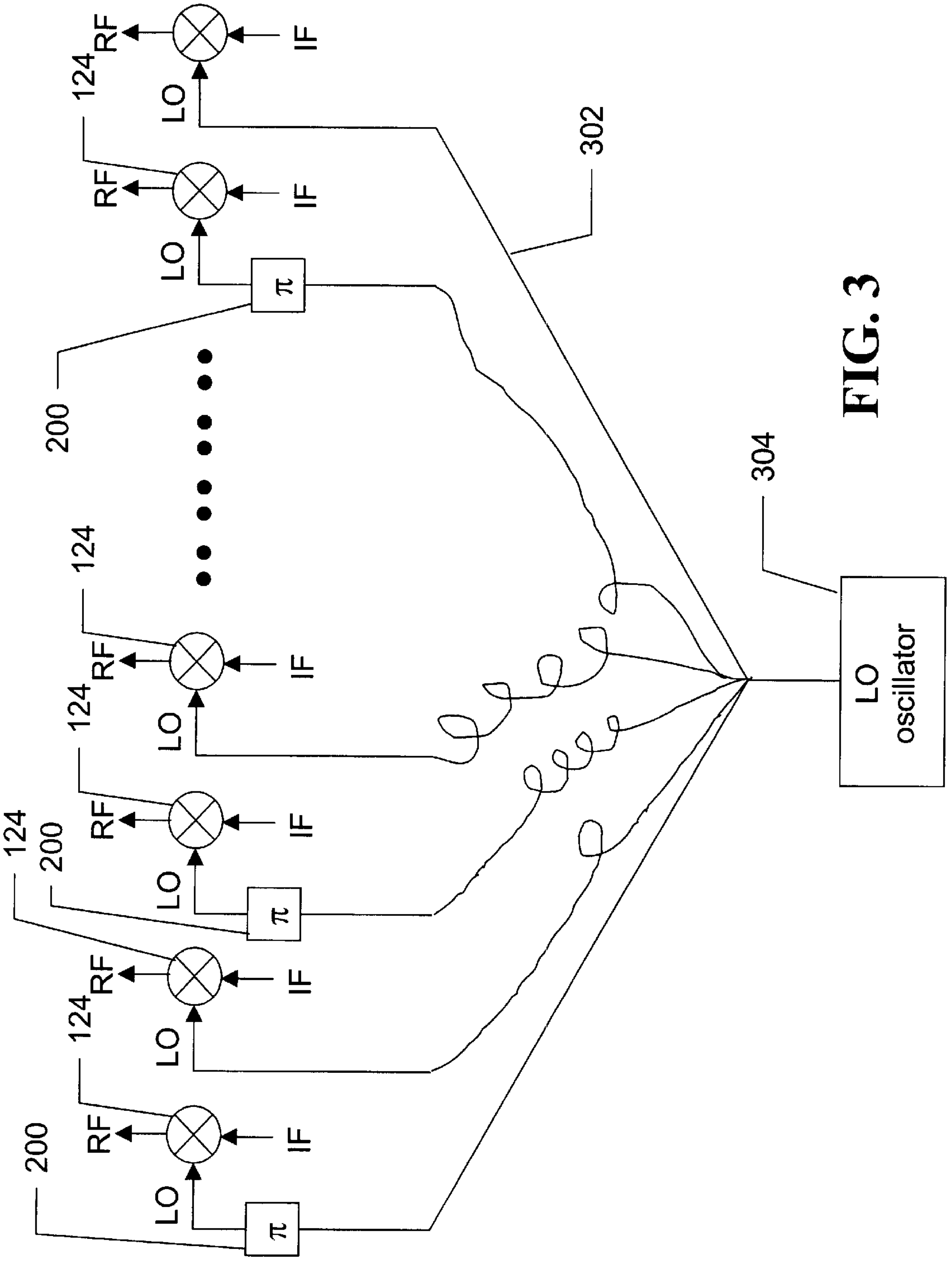
FIG. 3 depicts a block diagram illustrating the connections between an LO oscillator and a mixer in each elemental path.

The LO signal 128 is produced by a frequency generator 304 (shown in FIG. 3). Typically, one frequency generator produces the LO signals 128 for the upconverters 112 in all N elemental paths. The frequency generator typically produces one LO signal, which is then split into N paths and applied to the N upconverters 112. The LO signals applied to all of the upconverters 112 are thus all at the same frequency. For a conventional IF beamformed phased array, the LO signals all have approximately the same phase (coherent).

Upconverter 112 produces an RF signal having an output RF frequency which is normally the difference between or the sum of the two input signals. However, if the IF and LO frequencies are denoted $f_{IF}$ and $f_{LO}$, correspondingly, the output frequency could be any harmonic frequency $f_{RF}$=n $f_{If}$+m$f_{LO}$, where n and m are any positive or negative integers. RF filter 126 suppresses harmonic frequencies at other than the desired frequency.

The RF signal output by upconverter 112 is then amplified by output RF amplifier 118. Amplifier 118 is normally a Solid State Power Amplifier (SSPA). For single beam antennas (L=1), amplifier 118 is operated in the non-linear region for maximum efficiency. For multibeam antennas (L>1), amplifier 118 is operated at back-off to meet intermodulation requirements.

After the RF signal is amplified by amplifier 118, the RF signal passes through an output filter 120. The main purpose of output filter 120 is to suppress energy from being delivered from the transmit antenna into the receive antenna on the same spacecraft. Output filter 120 also suppresses spurious signals outside of the transmit frequency band to the ground to meet ITU regulations and other emission requirements. A typical output filter is a corrugated waveguide filter. A waveguide filter offers low loss which is critical since the filter is located downstream of the amplifier 118.

After the RF signal passes through output filter 120, antenna radiating element 122 converts the RF signal into radiated energy which is transmitted to a desired destination. An example of an antenna radiating element is described in U.S. Pat. No. 5,870,063 which discloses a subarray consisting of a 16-way waveguide power divider and 16 radiating dipole elements.

Antenna 100 shown in FIG. 1 is an active array antenna because the output amplifiers 120 are distributed at the antenna radiating element 122. The system of the present invention can also be used with passive antenna arrays. Passive arrays locate the amplifier at the input to the beamformer 104.

The term "elemental path" as used herein refers to a path from an input port 102 through an attenuator 106, a phase shifter 108, an upconverter 112, an output amplifier 118, an output filter 120, and a radiating element 122. There are L×N elemental paths within the beamformers 104, which then merge into N elemental paths at 110. The N antenna radiating elements 122 are typically arranged in a two-dimensional configuration (see FIGS. 3 and 4, described below).

A problem that exists for antenna 100 is that a portion of the Local Oscillator (LO) signal 128 having the LO frequency leaks into the output signal emitted from upconverter 112. That LO signal leakage is then transmitted from radiating element 122 as a spurious signal at the LO frequency. Since all the LO signals 128 in each elemental path are in the same approximate phase, they will all be in phase at the antenna element 122 when they are radiated. This means that there will be a strong LO leakage signal in the boresight direction of the antenna (the direction normal to the aperture of the antenna).

One way of reducing this LO leakage signal transmission is to use a mixer 124 or RF filter 126 with a better leakage specification; i.e. one that does a better job of suppressing the LO signal leakage from its output. That requires very good filtering of the LO signal. Typically a good filter may be able to reduce the LO signal leakage by 20 to 30 dB. However, to achieve such a degree of filtering drives up the cost of the mixer and the RF filter.

Another method for reducing the LO leakage signal transmission is to use an LO frequency that's low enough such that the LO signal is filtered out by the natural filtering of the radiating element 122 itself and the RF filter 126. The lower the LO is in frequency, the more natural filtering that occurs when the signal passes through output filter 120 and antenna radiating element 122. For instance, if the antenna radiating element 122 and output filter 120 are implemented as a waveguide element and the LO frequency is under the cut-off frequency for that waveguide, the waveguide output filter and antenna element will provide very good natural filtering.

In some instances, it will not be possible or desirable to choose an LO signal at such a low frequency. For example, in one application the RF signal is radiated at 20 GHz, and a 16 GHz LO frequency is used. The cut-off frequency of the waveguide radiating element is 15.3 GHz. If the LO frequency is 14.5 GHz, the attenuation of the LO leakage signal is more than 50 dB which solves most of the leakage problem. However, if the LO. frequency is 16 GHz, the attenuation is only about 4 dB. Therefore, at frequencies above around 16 GHz, another method is needed to better suppress the LO leakage problem.

The system of the present invention provides an effective method for suppressing the LO leakage signal, and thus makes the filter requirements for suppressing the LO signal less stringent. The preferred embodiment of the present invention solves the leakage problem by spreading most: of the power of the transmitted LO leakage signal outside of the earth disk. For example, suppose antenna 100 is transmitting a signal to a coverage area on the earth. The antenna 100 transmits the RF communication signal to the coverage area on the earth, while the spurious transmitted signal at LO frequency is substantially spread beyond the earth disk. The spurious signal is substantially spread to avoid the entire earth. Therefore, most of the spurious LO signal never reaches the ground. From the perspective of a geostationary satellite, the earth disk is 17.6 degrees in diameter. The antenna 100 thus spreads the radiated LO signal beyond this 17.6 degree disk.

Note that the antenna of the present invention is not limited to geostationary orbit satellites, but can be used for other satellite orbits as. well such as low earth orbits. The antenna of the present invention is not necessarily limited to transmission to the Earth. The transmissions could be made to another spacecraft or satellite or planet. The key is that the leakage signal is spread so that the desired recipient does not receive a strong leakage signal.

Figure 2:
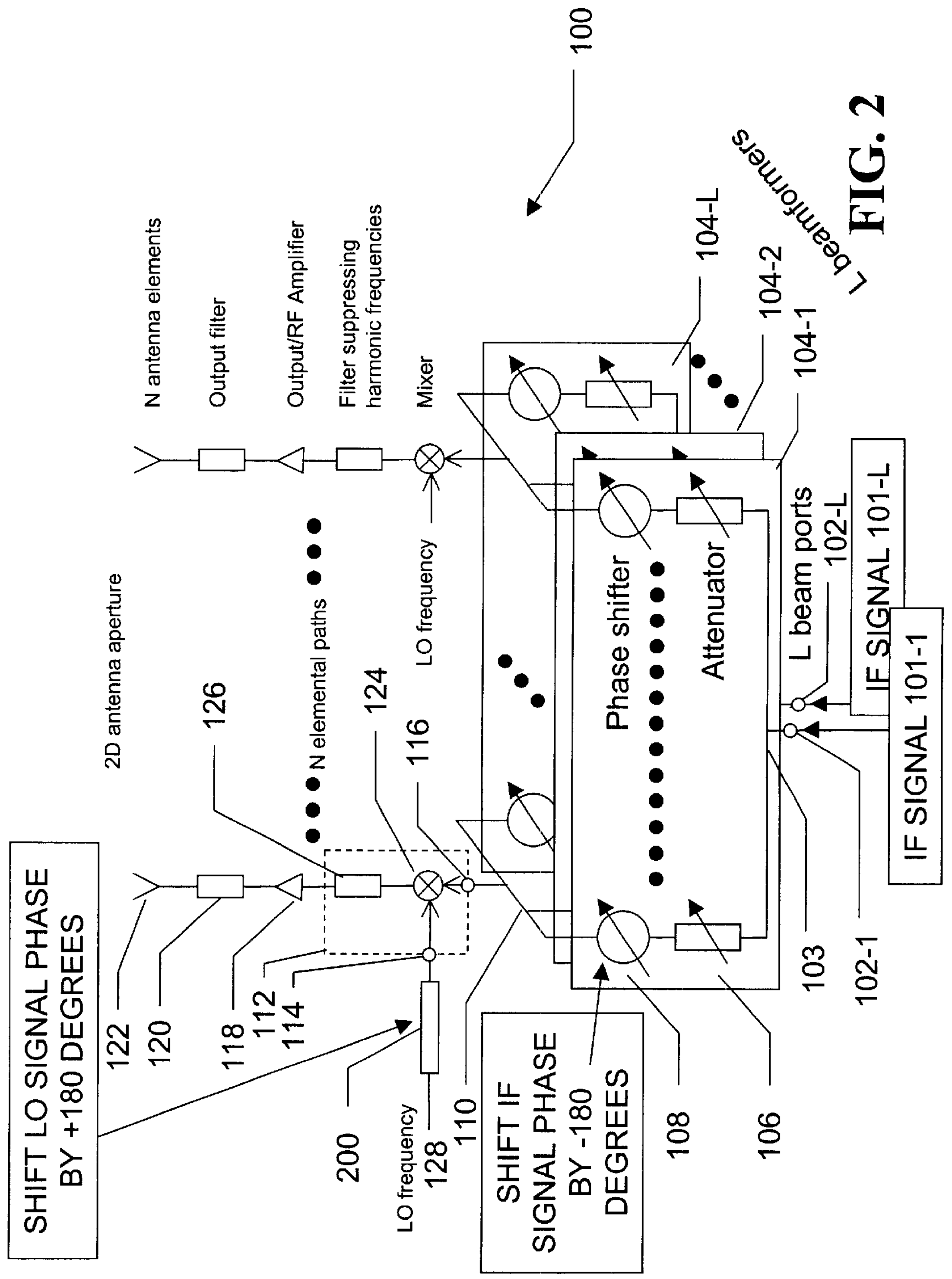
FIG. 2 illustrates a block diagram illustrating a transmitting phased array antenna with a transmission line inserted to shift the phase of the local oscillator signal.

One method of spreading the LO radiated signal outside of the coverage area is to adjust the phase of the LO signal 128 to a specific value in each elemental path. For example, FIG. 2 illustrates a method of spreading the LO signal beyond the earth disk by shifting the phase of the LO signal in every other elemental path by 180 degrees. More generally, the LO signal in every other elemental path is shifted by 180±360 n degrees, where n is any integer. This will cause the LO radiation pattern to have a null in the direction of the earth center (assuming that the antenna is transmitting towards the earth), with 4 main lobes separated by 90 degrees in phi-angle around the earth circle and with their peak at approximately 2 times the maximum edge-of-coverage theta-angle.

One simple method of accomplishing the phase shift of the LO signal is to insert a transmission line 200 having a length of $\lambda/2$ in the LO signal path prior to entering the mixer in every other elemental path, where $\lambda$ is the wavelength of the LO signal. This will introduce a phase shift of 180 degrees into the LO signal 128 in every other elemental path.

In the elemental paths in which a transmission line 200 is inserted, the phase shifter 108 in that elemental path also adjusts the phase of the IF signal to offset the phase introduced by the transmission line 200. In other Words, if the transmission line 200 introduces a phase shift of +180 degrees in the LO signal frequency, the phase shifter 108 introduces a phase shift in the IF signal of −180 degrees. In the absence of such an offset, transmission line 200 would introduce a 180 degree phase shift in the RF signal output of the upconverter 112, because the phase of the output of upconverter 112 is the sum of the phases of the two input signals (LO signal 112 and the IF signal entering input port 116). By performing such an offset, the introduction of the transmission line 200 will not affect the phase of the RF signal output from upconverter 112. The transmission line 200 will only have the effect of shifting the phase of the LO signal frequency by +180 degrees.

As an alternative to the use of phase shifter 108 to introduce an offsetting phase shift, a transmission line or other phase shifting device can be inserted into the IF portion of the elemental path to introduce the offsetting phase shift.

FIG. 3 illustrates the connections between an LO oscillator 304 (also called a frequency generator) and the mixer 124 in each elemental path. LO oscillator 304 produces the LO signal which is split up and provided to the mixer 124 in each elemental path over lines 302. Some of the lines 302 are shown having a "curled" appearance. The curls are shown merely to illustrate that the line lengths are the same for all of the LO paths. This assures that the LO signals will all have the same phase when applied to transmission lines 200. Transmission lines 200 (or other phase adjustment devices) are inserted in every other elemental path. Each transmission line introduces a phase shift of $\pi$ radians. Thus, at the point where LO signal is applied to each mixer 124, the phase of the LO signal will alternate 0, $\pi$, 0, $\pi$, . . . from path to path.

Figure 4:
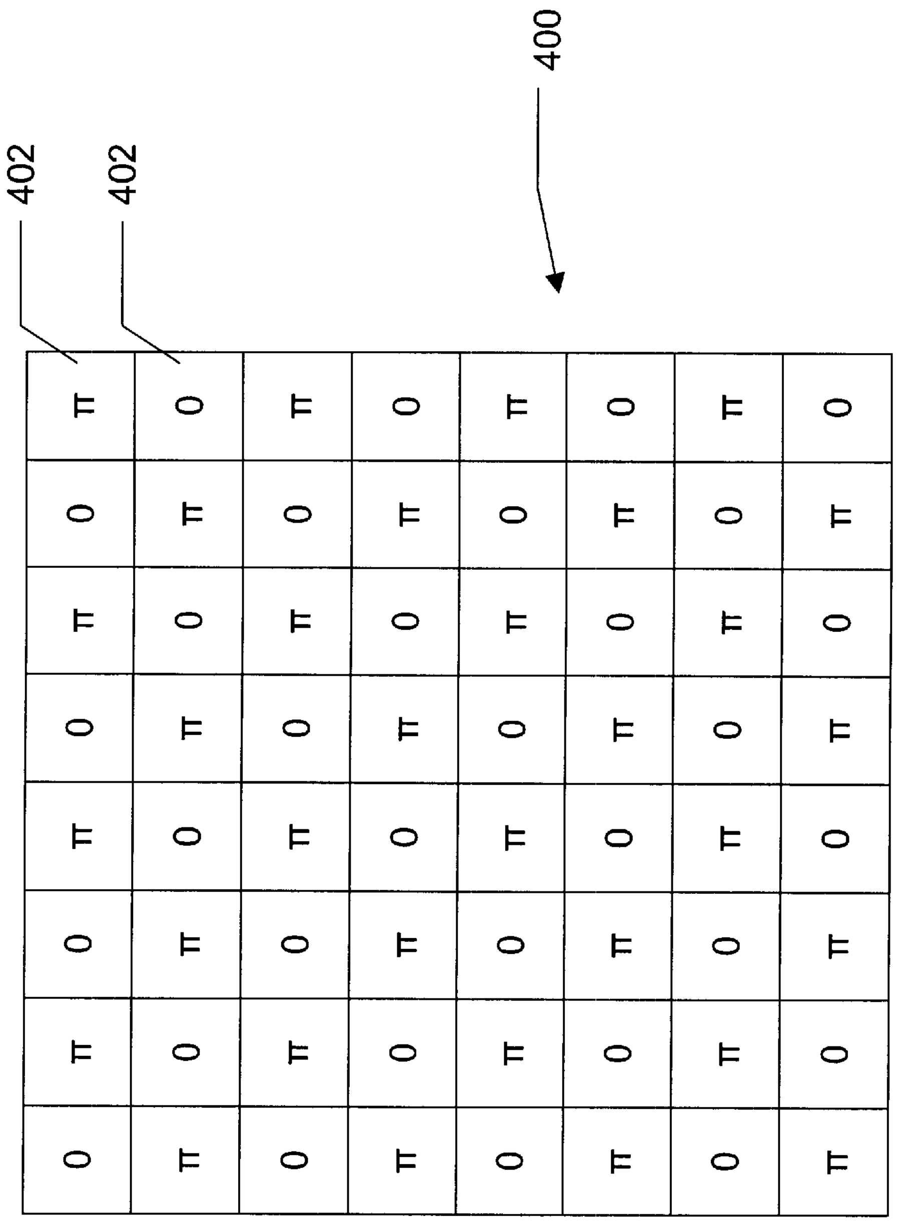
FIG. 4 shows an 8 by 8 supertile phased array antenna with phase shifts (in radians) for the LO signal in every other elemental path.

FIG. 4 illustrates the phase shifts applied to the LO signal in each elemental path of a phased array antenna 400. Antenna array 400 has 64 radiating elements 402 arranged in an 8 by 8 configuration. The radiating elements 402 that are labeled "$\pi$" are elements in which the LO signal frequency is shifted by $\pi$ radians (180 degrees). As can be seen, every other radiating element 402 has a phase shift of $\pi$ radians for signals at the LO frequency. This configuration of alternating LO phase shifts of $\pi$, 0 , $\pi$, 0, . . . from element to element produces a excitation pattern across the antenna array radiating elements which will be referred to herein as a "zero-pi" excitation pattern. In contrast, a "uniform excitation" pattern is a pattern where all of the LO signals are radiated approximately in phase.

Phase shift patterns for the LO signal other than that shown in FIG. 4 can be used. For example, a group of elements located together forming a subarray could all have a phase shift of +180 degrees, while the adjacent group of elements forming a second subarray has a phase shift of 0. Other phase shifts besides 0 and 180 can also be used. The key is to implement a phase shift configuration which spreads the LO spurious leakage transmission away from the desired coverage area.

Other methods of phase adjustment may be used besides a transmission line. For example, a phase shifter could be used, although this would be more complex. The local oscillator(s) could also contain circuitry to adjust the LO signal phase delivered to each mixer in each elemental path to the desired phase setting.

Figure 5:
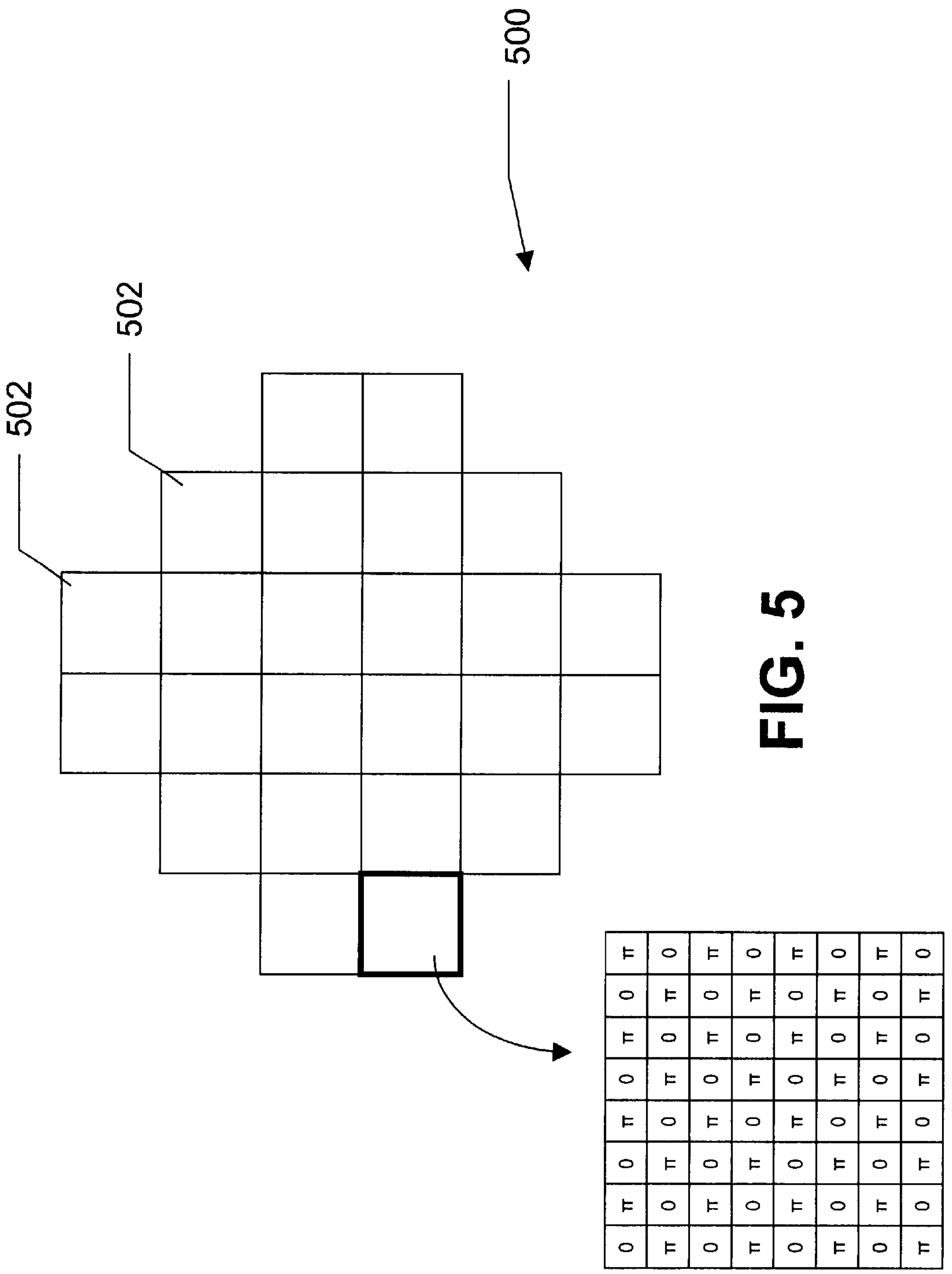
FIG. 5 shows a 24 supertile phased array antenna with phase shifts for the LO signal in every other elemental path.

FIG. 5 illustrates a supertile array 500 having 24 "supertiles" 502. Each supertile 502 is an 8 by 8 configuration of 64 radiating elements with zero-pi excitation like the tile shown in FIG. 4. Thus, the supertile array 500 shown in FIG. 5 has a total of 24×64=1536 radiating elements.

Supertile array 500 having a zero-pi excitation pattern produces a radiation output having asymmetry about the two major planes normal to the surface. This cancels out the sidelobes and grating lobes in these two planes. The 180 degree ($\pi$ radians) phase difference from radiating element to element steers the LO beam to approximately +15 degrees and the grating lobe to approximately −15 degrees in each of the diagonal planes, thereby spreading the transmitted energy of the LO frequency signal beyond the earth disk (this particular radiation pattern is specific to a phased array antenna in a geostationary orbit having $2\lambda$ spacing between radiating elements, where $\lambda$ is the wavelength of the LO signal).

Figure 6:
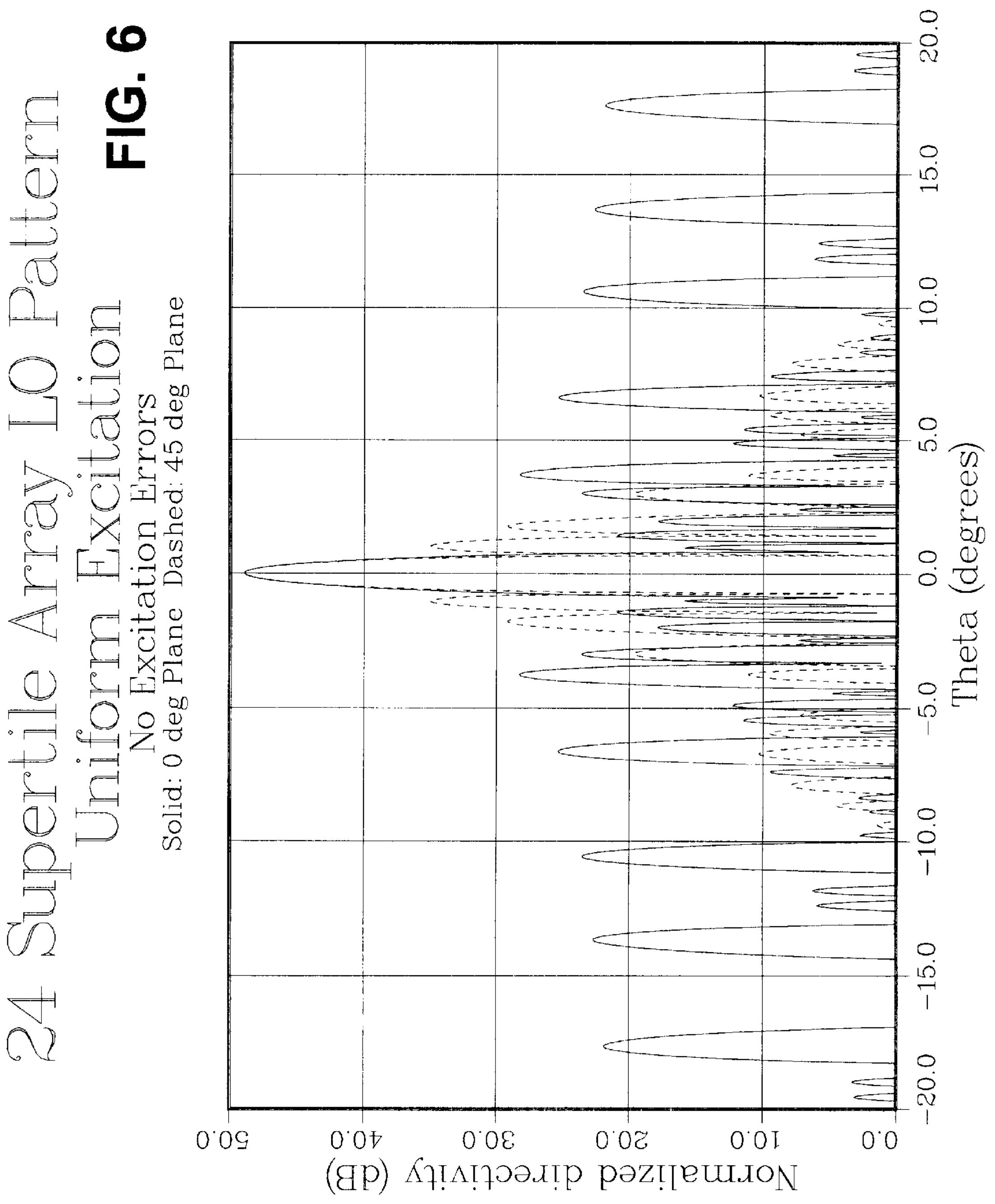
FIG. 6 depicts a graph showing the LO signal power received at the Earth from a 24 supertile array antenna without the LO phase shifts of the present invention.

FIG. 6 depicts a graph showing the LO signal power received at the Earth produced by a 24 supertile array antenna 500 shown in FIG. 4, except without the LO phase shifts of the present invention; i.e. there is a uniform LO excitation across the array. In other words, no phase shifts have been applied to the LO signals and the LO signals are all transmitted from the radiating elements approximately in phase. The graph shown in FIG. 6 is the result of a computer simulated model. The antenna 500 is assumed to have no excitation errors (i.e. no failed elements, no phase error, and no amplitude error). The solid line indicates the radiation output in the zero degree plane, and the dashed line indicates the radiation output in the 45 degree plane. The LO signal is transmitted at 16 GHz. As can be seen, the uniform excitation of the LO signal produces a borseight beam for the LO signal with a 48.9 dBi peak at theta=0 degrees.

Figure 7:
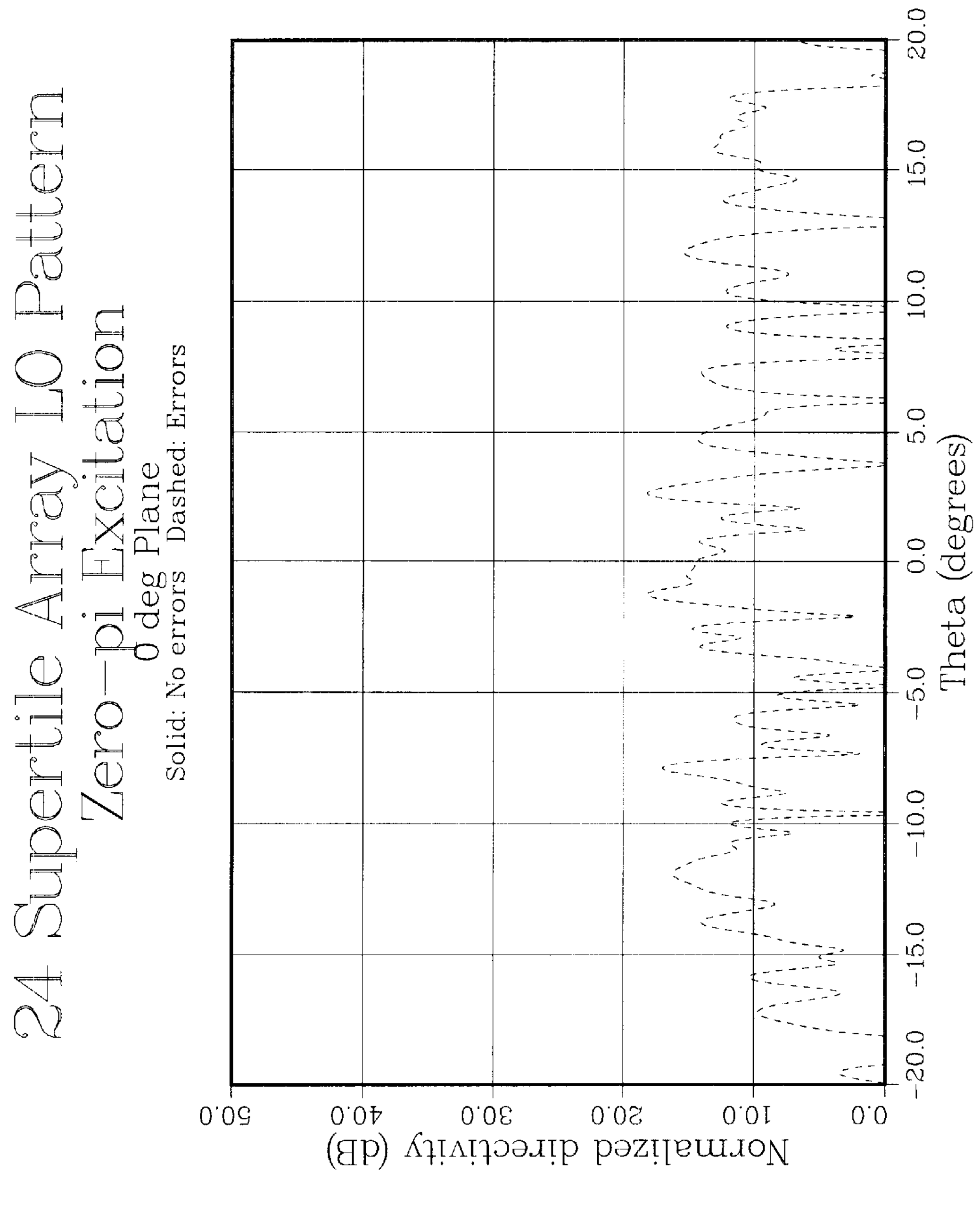
FIG. 7 depicts a graph showing the LO signal power received at the Earth in the zero degree plane from a 24 supertile array antenna with zero-pi LO phase shifts of the present invention.
Figure 8:
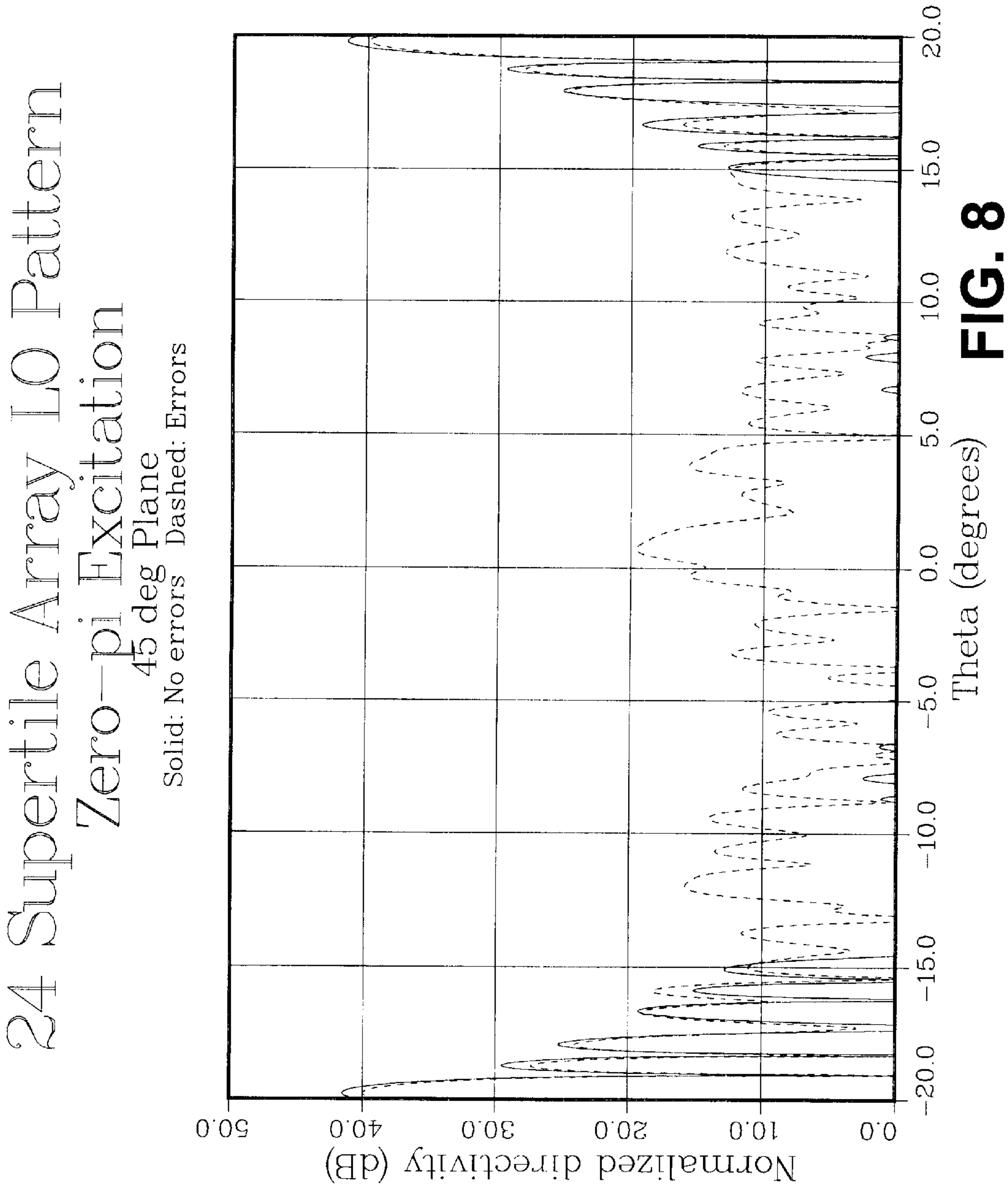
FIG. 8 depicts a graph showing the LO signal power received at the Earth in the 45 degree plane from a 24 supertile array antenna with zero-pi LO phase shifts of the present invention.

FIGS. 7 and 8 illustrate graphs depicting the LO signal power received at the Earth produced by an array 400 when the zero-pi LO signal phase shift excitation pattern of the present invention (shown in FIG. 5) is applied. The radiation output in the zero degree plane (FIG. 7) and 45 degree plane (FIG. 8) are shown. The dashed line indicates the radiation transmitted from an antenna having excitation errors (i.e. an array having 5% failed elements, RMS phase error=20 degrees, and an amplitude error=3.0 dB). The solid line indicates the radiation transmitted from an antenna having no excitation errors. As can be seen, the LO radiation output received at the Earth has been greatly reduced because the radiation has been spread out beyond the Earth disk. For the antenna with no excitation errors, the radiation received at the Earth in the zero degree plane is not visible on the graph (FIG. 7) because it falls below 0.0 dB.

Figure 9:
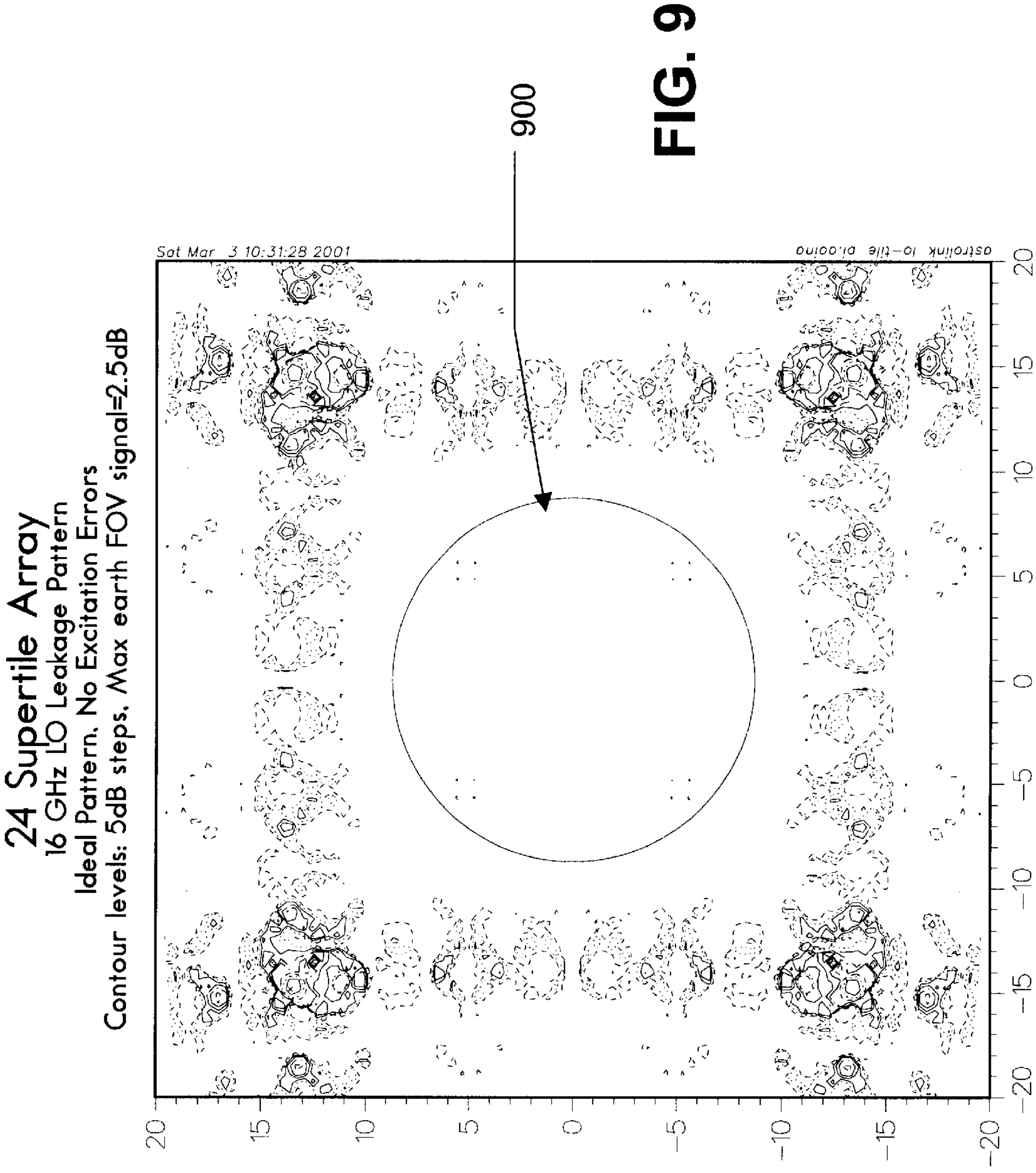
FIG. 9 depicts a LO radiation pattern produced by an array having the zero-pi LO signal phase shifts of the present invention.

FIG. 9 depicts an LO leakage contour radiation pattern at the Earth when using the 24 supertile array 500 having the zero-pi LO excitation pattern of the present invention across the array aperture for the LO signal. The LO signal is transmitted at 16 GHz. It is assumed that there are no failed radiating elements and no excitation errors. As can be seen, the LO radiation is substantially spread beyond the earth disk 900. In this case, the maximum LO signal received at the Earth FOV (field of view) is 2.5 dBi; an approximately 46.5 dB reduction of energy relative to the 49.0 dBi boresight LO beam produced by the array having a uniform excitation pattern for the LO signal.

Figure 10:
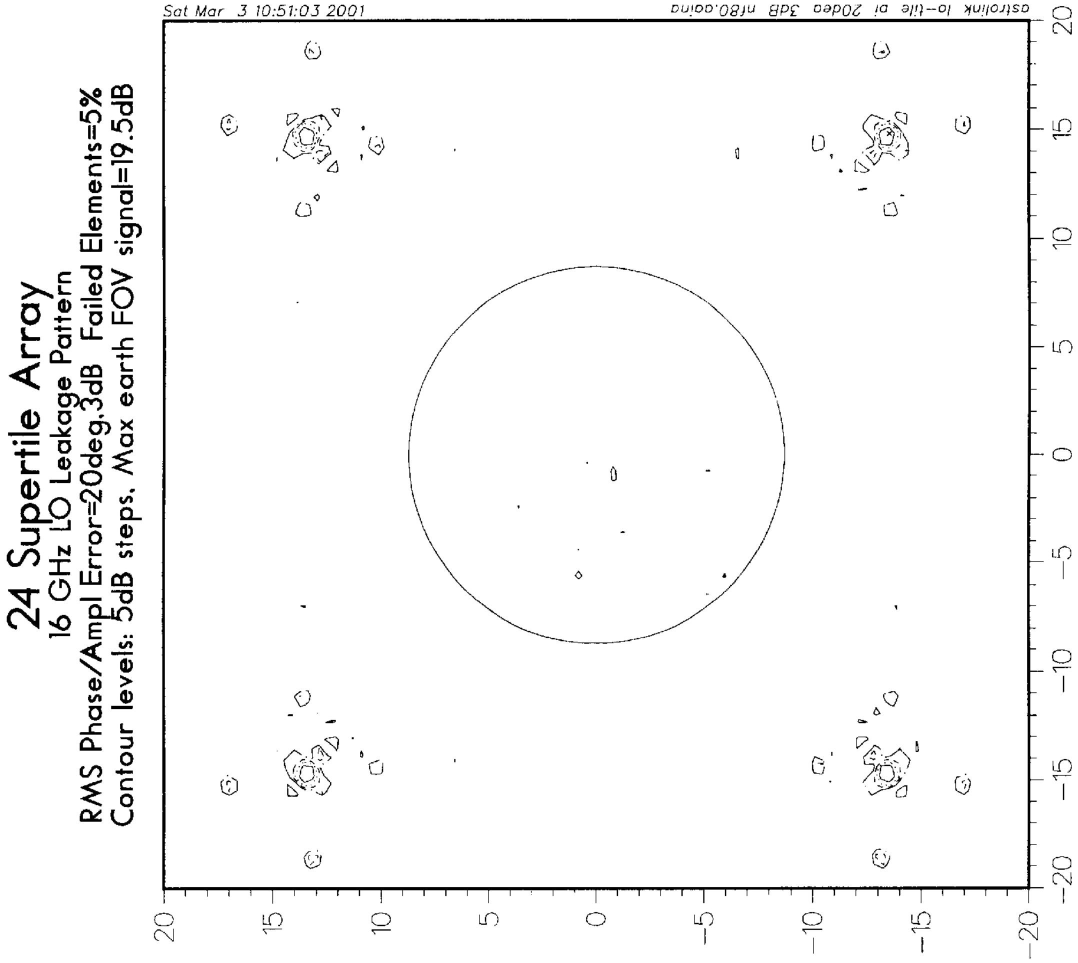
FIG. 10 depicts a LO radiation pattern produced by an array having the zero-pi LO signal phase shifts of the present invention, when the array has 5% failed elements, RMS phase error=20 degrees, and an amplitude error=3.0 dB.

FIG. 10 depicts the same contour radiation pattern as shown in FIG. 9, except this time an array 400 with excitation errors is used (i.e. an array having 5% failed elements, RMS phase error=20 degrees, and an amplitude error=3.0 dB). In this case, the maximum LO signal received at the Earth FOV is 19.5 dBi, an approximately 29.5 dB reduction of the LO signal relative to the 49.0 dBi boresight LO beam produced by an array having a uniform excitation pattern for the LO signal. Table 1 summarizes there and other results for an antenna radiating with the zero-pi LO excitation pattern.

TABLE 1

| RMS Phase Error(degrees) | RMS Amplitude Error (dB) | % RMS Element Failure | Reduction of the Peak LO Signal (dB) |
|---|---|---|---|
| 0 | 0 | 0 | 46.5 |
| 10 | 1.5 | 0 | 36.5 |
| 10 | 1.5 | 5 | 32.0 |
| 20 | 3.0 | 0 | 30.0 |
| 20 | 3.0 | 5 | 29.5 |

The "Reduction of the Peak LO Signal (dB)" column provides the reduction of the peak LO Signal power in dB received at the Earth FOV relative to the LO signal power received from an antenna transmitting with a uniform excitation pattern for the LO signal.

Although the present invention has been described in terms of various embodiments, it is not intended that the invention be limited to these embodiments. Modification within the spirit of the invention will be apparent to those skilled in the art. The scope of the present invention is defined by the claims that follow.

What is claimed is:

1. An antenna transmitting a signal to a coverage area, comprising:

a beamformer having a plurality of elemental paths;

a plurality of upconverters, each upconverter having a first input coupled to an output of a corresponding elemental path of the beamformer, and each upconverter having a second input receiving an oscillator signal;

a plurality of radiating elements, each radiating element coupled to an output of a corresponding upconverter; and at least one phase adjustment device coupled to at least one of the upconverters at the second input, wherein each phase adjustment device adjusts the phase of the oscillator signal provided to the corresponding upconverter in such a manner so as to substantially spread a leakage transmission of the oscillator signal beyond the coverage area.

2. The antenna of claim 1, wherein the leakage transmission of the oscillator signal is substantially spread beyond the earth disk.

3. The antenna of claim 1, wherein the at least one phase adjustment device is a transmission line.

4. The antenna of claim 3, wherein each transmission line has a length approximately equal to half the wavelength of the oscillator signal.

5. The antenna of claim 3, wherein the transmission lines are located at the second input of every other upconverter.

6. The antenna of claim 1, wherein the plurality of radiating elements are located in a two-dimensional grid, and wherein adjacent radiating elements radiate signals at the oscillator frequency which are approximately 180±360 n degrees out of phase, where n is any integer.

7. The antenna of claim 1, further comprising:

a plurality of beamformers, each beamformer having a plurality of elemental paths, and the output of each elemental path in each beamformer coupled to the output of a corresponding elemental path in the other beamformers.

8. The antenna of claim 7, wherein each beamformer receives an intermediate frequency signal at an input of each beamformer.

9. The antenna of claim 1, wherein each elemental path in the beamformer includes a phase shifter.

10. The antenna of claim 9, wherein the phase shifter introduces an intermediate frequency phase shift which offsets a phase shift introduced by an oscillator signal phase adjustment device in the same elemental path.

11. The antenna of claim 9, wherein an elemental path includes an offsetting transmission line which introduces an intermediate frequency signal phase shift which offsets an oscillator signal phase shift introduced by a oscillator signal phase adjustment device in the same elemental path.

12. An antenna transmitting a signal to a coverage area, comprising:

an upconverter having first and second inputs, the first input receiving a communication signal and the second input receiving an oscillator signal;

a radiating element coupled to the output of the upconverter; and an oscillator signal adjustment device coupled to the-second input of the upconverter, the oscillator signal adjustment device adjusting a characteristic of the oscillator signal in order to substantially spread an oscillator leakage signal transmitted from the radiating element beyond the coverage area.

13. The antenna of claim 12, wherein the characteristic of the oscillator signal is a phase of the oscillator signal.

14. The antenna of claim 12, wherein the antenna is a phased array antenna comprising a plurality of radiating elements.

15. The antenna of claim 12, further comprising:

a plurality of radiating elements:

a plurality of upconverters; and wherein each of the plurality of radiating elements is set to a corresponding phase which spreads the leakage of the oscillator signal transmitted from the radiating element beyond the coverage area.

16. An antenna transmitting a signal, comprising:

a beamformer;

a radiating element coupled to the output of the beamformer; and a phase adjustment device coupled to the radiating element, the phase adjustment device receiving a signal and adjusting the phase of the signal so that any leakage of the signal from the radiating element will be substantially spread beyond a coverage area of the antenna.

17. A method of transmitting a signal, comprising:

transmitting a first signal within a first frequency band to a coverage area;

transmitting a second signal, which is an oscillator leakage signal, within a second frequency band so that at least a portion of the second signal is spread beyond the coverage area.

18. The method of claim 17, wherein transmitting the second signal so that the second signal is spread beyond the coverage area, comprises:

setting the phase of the second signal in each of a plurality of elemental paths to a phase which produces a desired radiation pattern in order to substantially spread the second signal transmitted from a radiating element beyond the coverage area.

19. The method of claim 18, wherein the setting of the phase of the second signal, comprises:

setting the phase of the second signal in every other of the plurality of elemental paths to approximately 180±360 n degrees, where n is any integer.

20. The method of claim 19, wherein the second signal is a local oscillator signal.

* * * * *